US012773984B2

(12) United States Patent
Kinoshita

(10) Patent No.: US 12,773,984 B2
(45) Date of Patent: Oct. 27, 2026

(54) COLLISION AVOIDANCE ASSISTANCE DEVICE FOR VEHICLE, COLLISION AVOIDANCE ASSISTANCE METHOD, AND STORAGE MEDIUM

(71) Applicant: TOYOTA JIDOSHA KABUSHIKI KAISHA, Toyota (JP)

(72) Inventor: Toshiki Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/924,052

(22) Filed: Oct. 23, 2024

(65) Prior Publication Data

US 2025/0229772 A1 Jul. 17, 2025

(30) Foreign Application Priority Data

Jan. 16, 2024 (JP) ................................ 2024-004453

(51) Int. Cl.

| | |
|---|---|
| ***B60W 30/09*** | (2012.01) |
| ***B60W 10/18*** | (2012.01) |
| ***B60W 30/095*** | (2012.01) |
| ***B60W 50/14*** | (2020.01) |

(52) U.S. Cl.

CPC ............ *B60W 30/09* (2013.01); *B60W 10/18* (2013.01); *B60W 30/0956* (2013.01); *B60W 50/14* (2013.01); *B60W 2050/143* (2013.01); *B60W 2050/146* (2013.01)

(58) Field of Classification Search

CPC .. B60W 30/09; B60W 10/18; B60W 30/0956; B60W 50/14; B60W 2050/143; B60W 2050/146; B60W 2554/00; G08G 1/166; G08G 1/096725

USPC ........................................................ 701/301

See application file for complete search history.

(56) References Cited

U.S. PATENT DOCUMENTS

| | | | |
|---|---|---|---|
| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2021/0061309 | A1 | 3/2021 | Kawanai |

(Continued)

FOREIGN PATENT DOCUMENTS

| | | | | |
|---|---|---|---|---|
| JP | 2008204107 | A | * | 9/2008 |
| JP | 2009214764 | A | * | 9/2009 |
| JP | 2014-178971 | A | | 9/2014 |

*Primary Examiner* — Maceeh Anwari
(74) *Attorney, Agent, or Firm* — SoraIP, Inc.

(57) ABSTRACT

When a first condition, which is satisfied when a likelihood that a host vehicle will collide with a target is high, is satisfied, a driver assistance ECU starts a first operation (e.g., an alarm operation) to avoid a collision between the host vehicle and the target. When a particular state is occurring that includes at least one state of a state in which a user is presumed to be performing an operation on in-vehicle equipment, a state in which the user is making a hands-free a call using "the in-vehicle equipment and a mobile device that is connected to the in-vehicle equipment", and a state in which the mobile device communicably connected to the in-vehicle equipment is receiving an incoming signal, the driver assistance ECU changes the first condition to a "condition that is satisfied earlier than when the particular state is not occurring".

4 Claims, 6 Drawing Sheets

(56) References Cited

U.S. PATENT DOCUMENTS

| | | | |
|---|---|---|---|
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |
| 2021/0146958 | A1 | 5/2021 | Tanaka et al. |

* cited by examiner

COLLISION AVOIDANCE ASSISTANCE DEVICE FOR VEHICLE, COLLISION AVOIDANCE ASSISTANCE METHOD, AND STORAGE MEDIUM

CROSS-REFERENCE TO RELATED APPLICATION

This application claims priority to Japanese Patent Application No. 2024-004453 filed on Jan. 16, 2024, incorporated herein by reference in its entirety.

BACKGROUND

1. Technical Field

The disclosure relates to a collision avoidance assistance device for a vehicle, a collision avoidance assistance method, and a storage medium, for performing a collision avoidance assistance operations for reducing a likelihood of a host vehicle colliding with a target.

2. Description of Related Art

A conventional device shoots images of the face of a driver, using a driver monitor camera to acquire image data. When detecting that the driver is in an inattentive state (e.g., a distracted driving state) based on the image data, the conventional device generates an alarm (e.g., see Japanese Unexamined Patent Application Publication No. 2008-204107 (JP 2008-204107 A)).

SUMMARY

However, a certain amount of time is required to detect that the driver is in an inattentive state using the driver monitor camera. Accordingly, timing of executing the collision avoidance assistance operations, including the alarm, may be delayed.

The disclosure has been made to solve this issue. That is to say, an object of the disclosure is to provide a collision avoidance assistance device for a vehicle, a collision avoidance assistance method, and a storage medium, capable of quickly starting an operation (first operation) for avoidance of collision between a host vehicle and a target when it is presumed that attention of a driver to driving is reduced.

One aspect of a collision avoidance assistance device for a vehicle according to the disclosure includes a controller (10) configured to start a first operation (S235) for avoidance of collision between a host vehicle and a target, when a first condition, that is satisfied when a likelihood that the host vehicle will collide with the target is high, is satisfied (Yes in S230). For example, the first condition is a condition that is satisfied when a collision likelihood index value (TTC) indicating a likelihood of collision between the host vehicle and the target reaches a predetermined threshold (TTCth). Further, the first operation may be an alarm operation for issuing an alarm to a driver, or may be an automatic braking operation.

Further, the controller is configured to, when a particular state is occurring (S330), change the first condition to a first early-satisfied condition (Yes in S215, S250) that is a "condition that is satisfied earlier than when the particular state is not occurring (S390)". The particular state includes at least one state of a state in which a user of the host vehicle is presumed to be performing an operation on in-vehicle equipment installed in the host vehicle (S320), a state in which the user is performing a call using the in-vehicle equipment and a mobile device that is communicably connected to the in-vehicle equipment (S340), and a state in which the mobile device communicably connected to the in-vehicle equipment is receiving an incoming signal (S350).

When the particular state that is described above is occurring, generally, the attention of the driver, who is the user of the host vehicle, to driving, is reduced. Further, whether the particular state is occurring can be immediately detected based on signals from the in-vehicle equipment. Thus, according to the above aspect, when the attention of the driver to driving is reduced, the first operation for collision avoidance can be promptly started.

In addition, when the first operation is an operation that issues an alarm (alarm operation), the first condition is preferably changed to the first early-satisfied condition, only when the target is either a two-wheeled vehicle or a pedestrian. This is because two-wheeled vehicles and pedestrians are targets that are relatively difficult for drivers, whose attention to driving is reduced, to notice. This enables the driver to recognize, at an early stage, two-wheeled vehicles or pedestrians regarding which there is a high likelihood that the driver will overlook.

Further, there are cases in which the device is configured such that automatic braking is executed at a timing later than the alarm operation that is the first operation. In this case, the automatic braking is preferably executed earlier when the particular state is occurring, regardless of the type of target, than when the particular state is not occurring (see S605 to S615 in FIG. 6).

In the above description, names and/or signs used in the embodiment are added in parentheses to the configurations of the disclosure corresponding to the embodiment to be described later, to facilitate understanding of the disclosure. However, the components of the disclosure are not limited to the embodiment defined by the names and/or the signs. The disclosure also encompasses a collision avoidance assistance method for a vehicle, and a storage medium.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A "collision avoidance assistance device DS for a vehicle (hereinafter referred to as "device DS")" according to an embodiment of the disclosure includes components illustrated in FIG. 1 and is applied to (installed in) a host vehicle HV. The host vehicle HV may be any one of a vehicle in which an internal combustion engine is a power source, a vehicle in which an electric motor is a power source (i.e., a battery electric vehicle), a hybrid electric vehicle, or the like.

In the present specification, "ECU" refers to an electronic control unit (control unit) equipped with a microcomputer including a central processing unit (CPU) (processor), read-only memory (ROM), random-access memory (RAM), non-volatile memory to which data can be written, an interface, and so forth. The ECU is also referred to as a controller or a computer. A plurality of ECUs, which is illustrated in FIG. 1, is mutually connected via a Controller Area Network (CAN) so as to be able to exchange information with each other. Some or all of these ECUs may be integrated into one ECU. Each of the ROM, the RAM, and the non-volatile memory is an example of a storage medium. A program of the embodiment is stored in at least one of the storage media.

Figure 1:
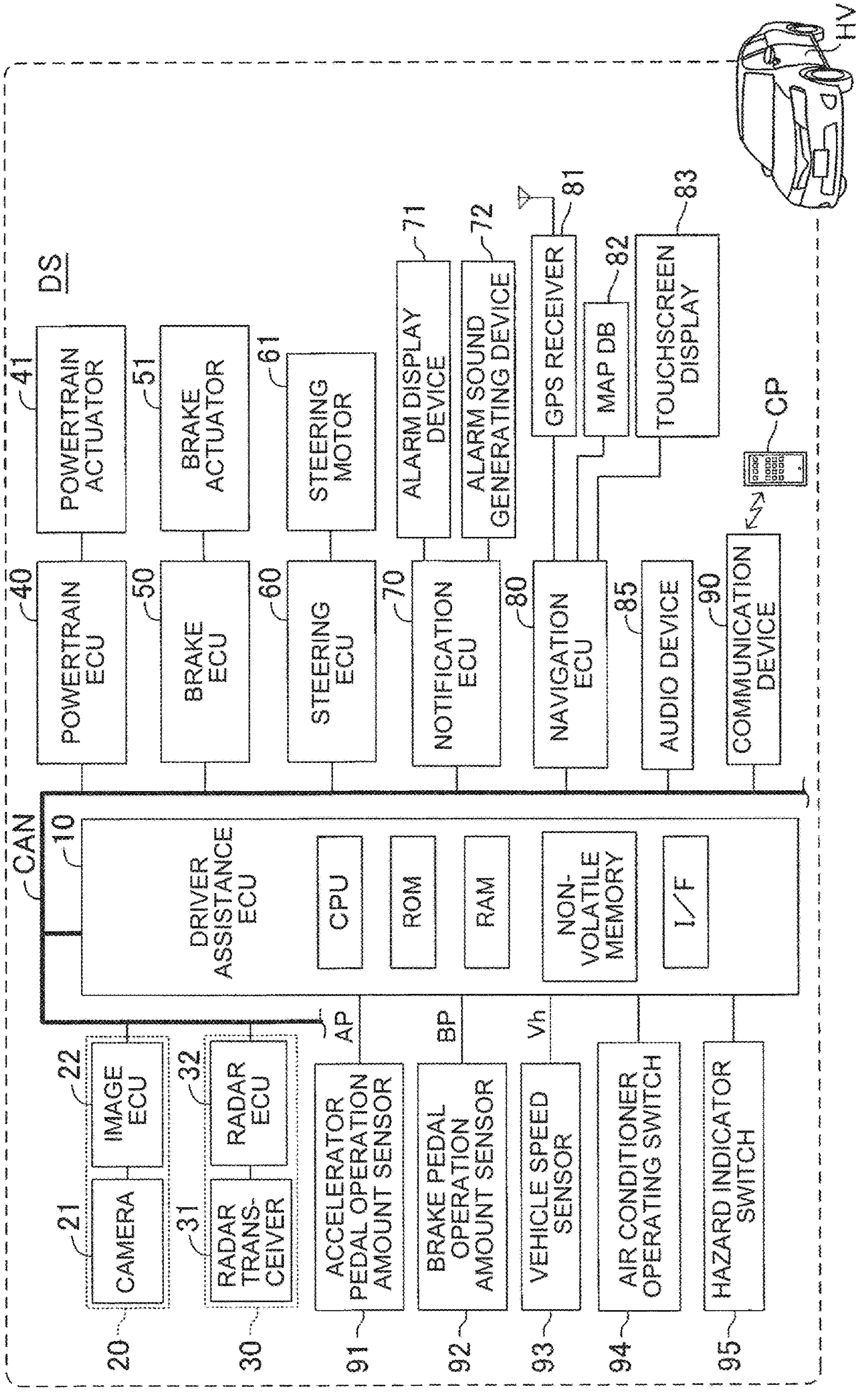
FIG. 1 is a schematic configuration diagram of a collision avoidance assistance device for a vehicle, according to an embodiment of the disclosure.

A driver assistance ECU 10 uses the components illustrated in FIG. 1 to execute collision avoidance assistance control (driver assistance control) for reducing the likelihood of the host vehicle colliding with a target (obstruction).

A camera device 20 includes a camera 21 and an image ECU 22. The camera 21 shoots an image of a scene ahead of the host vehicle HV every time a predetermined amount of time elapses, to acquire image data. The image ECU 22 generates camera information based on the image data every time a predetermined amount of time elapses, and transmits the camera information to the driver assistance ECU 10. The camera information includes the image data itself, and camera target information such as "position relative to the host vehicle HV, relative longitudinal speed, relative lateral speed, and type" of the target that is shot. The types of targets include other vehicles, two-wheeled vehicles (including motorcycles, bicycles, electric kick scooters, and so forth), and pedestrians.

The radar device 30 is a well-known device that acquires information regarding a target that is present ahead of the host vehicle HV by using millimeter wave band radio waves, and includes a radar transceiver 31 and a radar ECU 32. The radar transceiver 31 transmits millimeter waves within a predetermined detection range every time a predetermined amount of time elapses, and receives the millimeter waves reflected by the target. The radar transceiver 31 transmits information regarding the transmitted and received millimeter waves to the radar ECU 32. The radar ECU 32 acquires radar information including "distance to the target, direction of the target, relative speed of the target, and so forth" based on the information from the radar transceiver 31, and transmits the radar information to the driver assistance ECU 10. Note that the driver assistance ECU 10 generates fusion target information that ultimately identifies the "position, relative speed, type, and so forth" of the target by integrating (fusing) the camera information and the radar information.

A powertrain ECU 40 controls a drive device including a power source of the host vehicle HV (omitted from illustration) by driving a powertrain actuator 41, thereby generating driving force.

A brake ECU 50 controls a braking device (omitted from illustration) of the host vehicle HV by driving a brake actuator 51, thereby applying braking force to the host vehicle HV. When the brake ECU 50 receives an instruction from the driver assistance ECU 10, the brake ECU 50 drives the brake actuator 51 to execute automatic braking in which the braking force is automatically applied to the host vehicle HV.

The steering ECU 60 controls a steering device (omitted from illustration) of the host vehicle HV by driving a steering motor 61, thereby changing a steering angle of the host vehicle HV.

A notification ECU (alarm ECU) 70 is connected to an alarm display device 71 arranged in a position visible from a driver's seat, and an alarm sound generating device 72 that generates an alarm sound, and controls these in accordance with instructions from the driver assistance ECU 10.

A navigation ECU 80 is connected to a Global Positioning System (GPS) receiver 81, a map database 82 that stores map information, and a display (touchscreen) 83 that displays touch buttons, and together with these, makes up an in-vehicle navigation system. The navigation ECU 80 acquires a current position of the host vehicle HV based on GPS signals received by the GPS receiver 81. The navigation ECU 80 provides route guidance to a destination that is input using the display 83, based on the current position of the host vehicle HV that is acquired, and the map information stored in the map database 82.

An audio device 85 includes a "radio receiver, an amplifier, a control circuit, and a speaker", none of which are illustrated. The control circuit is equipped with Bluetooth functionality. The audio device 85 is arranged to display operating buttons on the display 83 by way of the navigation ECU 80. The audio device 85 outputs various sounds from a speaker in accordance with operations on the operating buttons displayed on the display 83.

A communication device 90 wirelessly communicates with external devices that are outside of the host vehicle HV (e.g., roadside devices, information management centers, and so forth) and can acquire various types of information from the external devices. Further, the communication device 90 has Bluetooth functionality. A user of the vehicle can set a mobile device including a mobile phone CP and the communication device 90 to a mutually communicable state by Bluetooth-connecting the mobile phone CP to the communication device 90, and thus can make hands-free calls. The communication device 90 causes the display 83 to display operating buttons by way of the navigation ECU 80. The user can operate the operating buttons displayed on the display 83 to perform operations including making telephone (mobile phone CP) calls. Further, when the mobile phone CP Bluetooth-connected to the communication device 90 is in a state of receiving an incoming call signal (incoming call state), the communication device 90 can display a screen indicating this on the display 83 by way of the navigation ECU 80.

The driver assistance ECU 10 inputs detection values (output values) of the following "sensors and switches".

- An accelerator pedal operation amount sensor 91 that detects an accelerator pedal operation amount AP of the host vehicle HV.
- A brake pedal operation amount sensor 92 that detects a brake pedal operation amount BP of the host vehicle HV.
- A vehicle speed sensor 93 that detects speed of the host vehicle HV (i.e., host vehicle speed).
- An operating switch 94 for an air conditioner of the host vehicle HV. An air conditioning device of the host vehicle HV that is omitted from illustration adjusts temperature, amount of air blown, and so forth, inside a vehicle cabin in accordance with operation of the operating switch 94.
- A hazard indicator switch 95 for in-phase flashing all turn indicators of the host vehicle HV.

Overview of Operations

When the driver operates an operating switch of in-vehicle equipment (hereinafter referred to as "first case"), the attention that the driver pays to driving will often become reduced. The operating switches for the in-vehicle equipment include various touch-operable operating buttons displayed on the display 83, the operating switch 94 for the air conditioner, the hazard indicator switch 95, and the like. Further, when the driver is making a hands-free call using the mobile phone CP of the driver him/herself, and the communication device 90 (hereinafter referred to as "second case"), the attention that the driver pays to driving will often become reduced. In addition, when an incoming call is being received by the mobile phone CP that is communicably connected to the communication device 90 (hereinafter referred to as "third case"), a message thereof is displayed on the display 83, and accordingly the attention that the driver pays to driving will often become reduced. Accordingly, in such cases, the device DS advances a timing of starting collision avoidance assistance operations, including issuing an alarm, as compared to a timing in a case otherwise. This enables the driver to notice the presence of an obstruction early on when his or her attention to driving is reduced, and to take appropriate measures against the obstruction.

Specific Operations

A CPU of the driver assistance ECU 10 (hereinafter simply referred to as "CPU") executes routines shown in flowcharts of FIGS. 2 to 4 every time a predetermined amount of time (computation cycle) dt elapses. Note that in the following, "step" is abbreviated to "S".

Collision Avoidance Assistance

Figure 2:
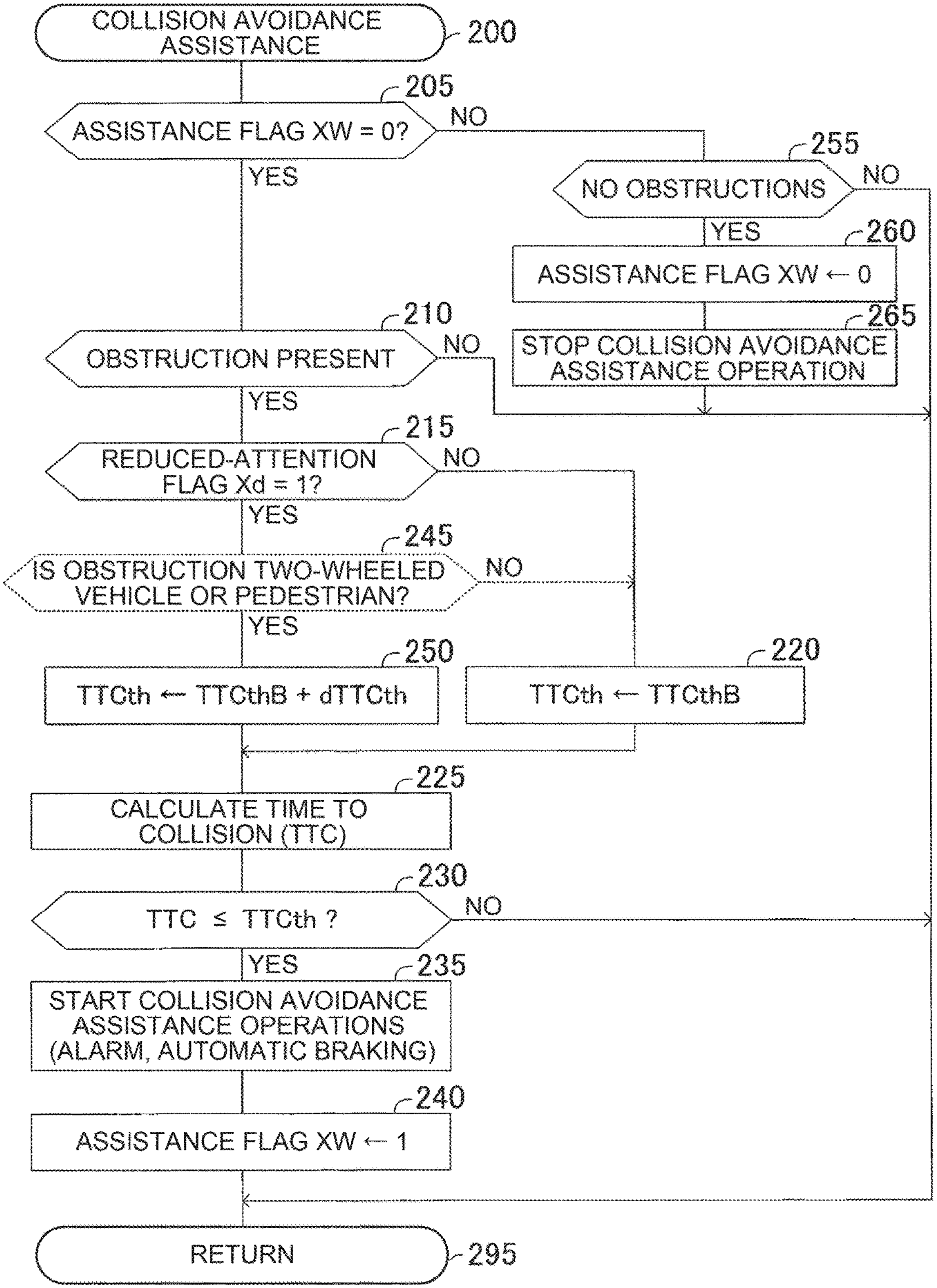
FIG. 2 shows a routine executed by a control processing unit (CPU) of a driver assistance electronic control unit (ECU) illustrated in FIG. 1.

At a predetermined timing, the CPU starts processing from S200 in FIG. 2 and advances to S205, and determines whether a value of an assistance flag XW is "0". When the value of the assistance flag is "1", this means that a collision avoidance assistance operation (first operation) is being executed. The value of the assistance flag XW, and a value of a reduced-attention flag Xd which will be described later, are set to "0" by an unshown initialization routine that is executed by the CPU when a start switch (omitted from illustration) of the host vehicle HV is changed from an off position to an on position. The start switch is, for example, an ignition key switch and a ready switch or the like.

When the value of the assistance flag XW is "0", the CPU advances from S205 to S210. In S210, the CPU determines whether an obstruction (target) is present in a region through which the host vehicle HV will travel within a certain period of time (host vehicle travel region), based on the fusion target information (i.e., camera information and radar information). When no target (obstruction) is present in the host vehicle travel region, the CPU advances directly from S210 to S295 and ends this routine for the time being.

On the other hand, when an obstruction is present in the host vehicle travel region, the CPU advances from S210 to S215, and determines whether the value of the reduced-attention flag Xd is "1". The reduced-attention flag Xd is set to "1" when it is presumed that the attentiveness to driving of the driver is decreasing (see FIG. 3 described later).

Figure 4:
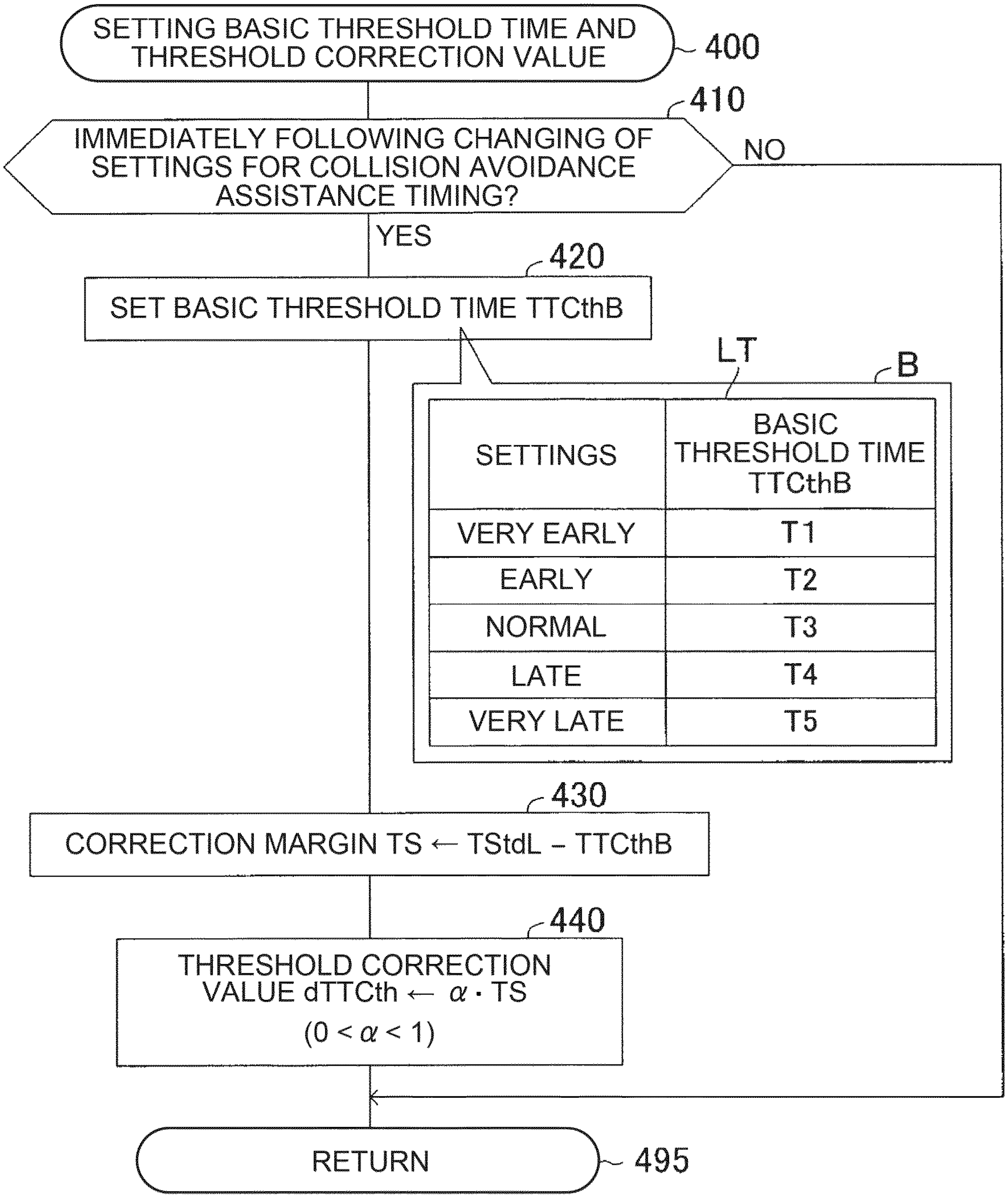
FIG. 4 shows a routine executed by the CPU of the driver assistance ECU illustrated in FIG. 1.

When the value of the reduced-attention flag Xd is not "1" (i.e., when "0"), the CPU makes a determination of "No" in S215 and advances to S220, and sets a collision determination threshold time TTCth to a basic threshold time TTCthB (see block B in FIG. 4). The basic threshold time TTCthB is a value that is set (changed) by operations performed by the driver. Next, the CPU advances from S220 to S225.

In S225, the CPU calculates a Time To Collision TTC by dividing a distance between the obstruction and the host vehicle HV by the relative speed of the obstruction. That is to say, the CPU calculates the time required for the host vehicle to collide with the obstruction as the Time To Collision TTC. The Time To Collision TTC is a value that decreases as the likelihood of the host vehicle HV colliding with the obstruction increases, and is one of collision likelihood index values that indicate the likelihood of a collision between the host vehicle HV and an obstruction.

Next, the CPU advances to S230, and determines whether the Time To Collision TTC is no more than a collision determination threshold time TTCth (in this case, basic threshold time TTCthB). That is to say, in S230, the CPU determines whether a collision avoidance assistance starting condition (alarm generation condition), which is satisfied when prediction is made that the host vehicle will collide with a target, is satisfied. For convenience, the collision avoidance assistance starting condition is also referred to as "first condition".

When the Time To Collision TTC is not no more than the collision determination threshold time TTCth, the CPU advances directly from S230 to S295 and ends this routine for the time being. Conversely, when the Time To Collision TTC is no more than the collision determination threshold time TTCth, the CPU advances from S230 to S235.

The CPU starts an alarm generating operation (first operation) as a collision avoidance assistance operation. More specifically, the CPU transmits an instruction signal to the alarm ECU 70, to cause the alarm display device 71 to display an alarm (attention) mark and also cause the alarm sound generating device 72 to generate an alarm sound. Next, the CPU advances to S240, and sets the value of the assistance flag XW to "1". Thereafter, the CPU advances to S295.

On the other hand, when the CPU advances to S215, and the value of the reduced-attention flag Xd is "1", the CPU makes a determination of "Yes" in S215, and advances to S245. In S245, the CPU determines whether the type of obstruction is a "two-wheeled vehicle or a pedestrian". When the type of obstruction is neither of "two-wheeled vehicle and pedestrian", the CPU advances from S245 to the above-described S220.

On the other hand, when the type of obstruction is either of "two-wheeled vehicle and pedestrian", the CPU advances from S245 to S250. In S250, the CPU sets the collision determination threshold time TTCth to "value obtained by adding positive threshold correction value dTTCth (sec S440 in FIG. 4) to basic threshold time TTCthB". Thus, the first condition is changed to a first early-satisfied condition ($TTC \leq TTCthB + dTTCth$) which is satisfied earlier than the normal condition ($TTC \leq TTCthB$). Note that the processing of S245 can be omitted, which will be described later.

As a result, when the Time To Collision TTC is no more than the collision determination threshold time TTCth (in this case, TTCthB+threshold correction value dTTCth), determination is made that the collision avoidance assistance starting condition (alarm generation condition, first condition) is satisfied. In S235, a collision avoidance assistance operation (alarm generation operation, first operation) is started. That is to say, when the value of the reduced-attention flag Xd is "1", the collision avoidance assistance operation is executed at an earlier timing than when the value of the reduced-attention flag Xd is not "1".

As can be understood from the above, when the value of the reduced-attention flag Xd is "1" and also the obstruction is a two-wheeled vehicle or a pedestrian, the condition is changed to the first early-satisfied condition. The first early-satisfied condition is a condition in which the first condition is satisfied at an earlier timing than when the value of the reduced-attention flag Xd is "0". Accordingly, when the attention to driving of the driver is reduced, the driver can be made aware of an obstruction at an earlier stage. Also, when a configuration is made such that the processing of S245 is not to be executed, and the value of the reduced-attention flag Xd is "1", the condition is changed to the first early-satisfied condition in which the first condition is satisfied at an earlier timing than when the value of the reduced-attention flag Xd is "0".

Now, upon the CPU advancing to S205 when the value of the assistance flag XW is set to "1", the CPU advances from S205 to S255. At S255, the CPU determines whether a target (obstruction) is present in the host vehicle travel region. When a target (obstruction) is present in the host vehicle travel region, the CPU advances directly from S255 to S295. Accordingly, in this case, display of the alarm mark and generation of the alarm sound continue.

On the other hand, when the target (obstruction) is no longer present in the host vehicle travel region, the CPU advances from S255 to S260, and sets the value of the assistance flag XW to "0". Next, the CPU advances from S260 to S265, and stops the alarm generation operation serving as the collision avoidance assistance operation. Thereafter, the CPU advances directly from S265 to S295 and ends this routine for the time being.

Setting Reduced-Attention Flag

Figure 3:
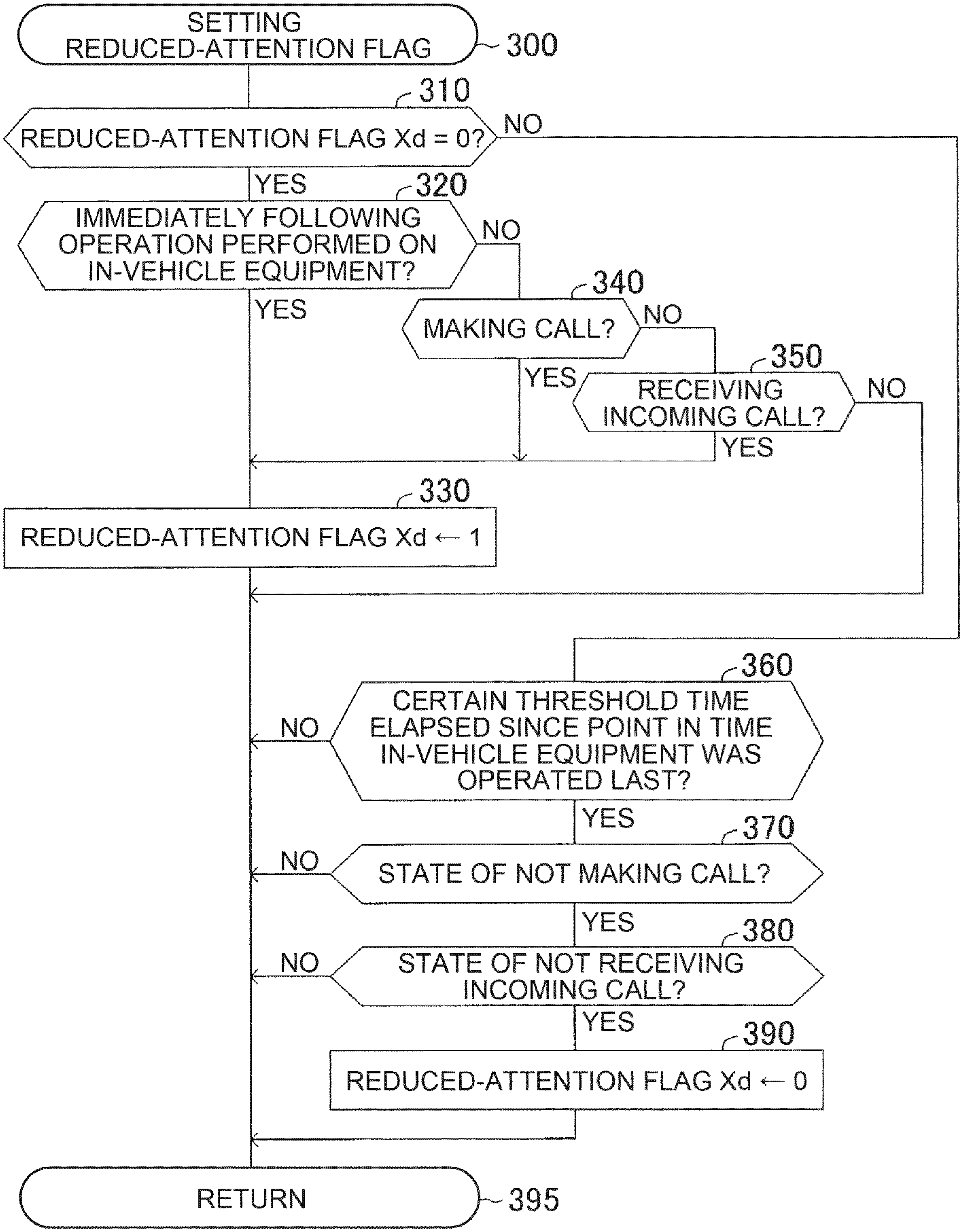
FIG. 3 shows a routine executed by the CPU of the driver assistance ECU illustrated in FIG. 1.

At a predetermined timing, the CPU starts processing from S300 in FIG. 3 and advances to S310, and determines whether the value of the reduced-attention flag Xd is "0".

When the value of the reduced-attention flag Xd is "0", the CPU advances from S310 to S320, and determines whether the current point in time is immediately following an operation performed on in-vehicle equipment. Operations on in-vehicle equipment include operation of the operating switch 94 for the air conditioner, operation of the hazard indicator switch 95, touch operations of various operating buttons displayed on the touchscreen display 83, and so forth.

When the current point in time is immediately following an operation performed on in-vehicle equipment, the CPU advances from S320 to S330, and sets the value of the reduced-attention flag Xd to "1". Thereafter, the CPU advances to S395. When the current point in time is not immediately following an operation performed on in-vehicle equipment, the CPU advances from S320 to S340.

In S340, the CPU determines whether a user of the host vehicle, including the driver, is making a hands-free call using the "mobile phone CP that is Bluetooth-connected to the communication device 90" and the "communication device 90". When a hands-free call is being made, the CPU advances from S340 to S330, sets the value of the reduced-attention flag Xd to "1", and then advances to S395. When a hands-free call is not being performed, the CPU advances from S340 to S350.

In S350, the CPU determines whether the mobile phone CP that is Bluetooth-connected to the communication device 90 is receiving an incoming call signal (i.e., an incoming call is being received). When an incoming call is being received, the CPU advances from S350 to S330, sets the value of the reduced-attention flag Xd to "1", and then advances to S395. When no incoming call is being received, the CPU advances from S350 to S395.

On the other hand, when the CPU advances to S310, and the value of the reduced-attention flag Xd is "1", the CPU advances from S310 to S360, and determines whether a certain threshold time has elapsed since the point in time the in-vehicle equipment was operated last. When the certain threshold time has not elapsed since the point in time at which the in-vehicle equipment was operated last, the CPU advances directly from S360 to S395. Accordingly, the value of the reduced-attention flag Xd is maintained at "1".

On the other hand, when the certain threshold time has elapsed since the point in time at which the in-vehicle equipment was operated last, the CPU advances from S360 to S370. In S370, the CPU determines whether the state at the current point in time is a state in which a hands-free call using the mobile phone CP and the communication device 90 is not being performed. When the state at the current point in time is a state in which a hands-free call is being made (i.e., a call is in progress), the CPU advances directly from S370 to S395. Accordingly, the value of the reduced-attention flag Xd is maintained at "1".

On the other hand, when the state at the current point in time is a state in which a hands-free call is not being performed, the CPU advances from S370 to S380. In S380, the CPU determines whether the state at the current point in time is a state in which the "mobile phone CP Bluetooth-connected to the communication device 90" is not receiving an incoming call signal. When the state at the current point in time is a state in which a call is being received by the "mobile phone CP that is Bluetooth-connected to the communication device 90", the CPU advances directly from S380 to S395. Accordingly, the value of the reduced-attention flag Xd is maintained at "1".

On the other hand, when the state at the current point in time is not a state in which "the mobile phone CP Bluetooth-connected to the communication device 90" is receiving a call, the CPU advances from S380 to S390. In S390, the CPU sets the value of the reduced-attention flag Xd to "0". Thereafter, the CPU advances to S395.

Deciding Basic Threshold Time and Threshold Correction Value

At a predetermined timing, the CPU starts processing from S400 in FIG. 4, advances to S410, and determines whether the current point in time is a "point in time immediately following a point in time of changing settings of collision avoidance assistance timing".

Figure 5:
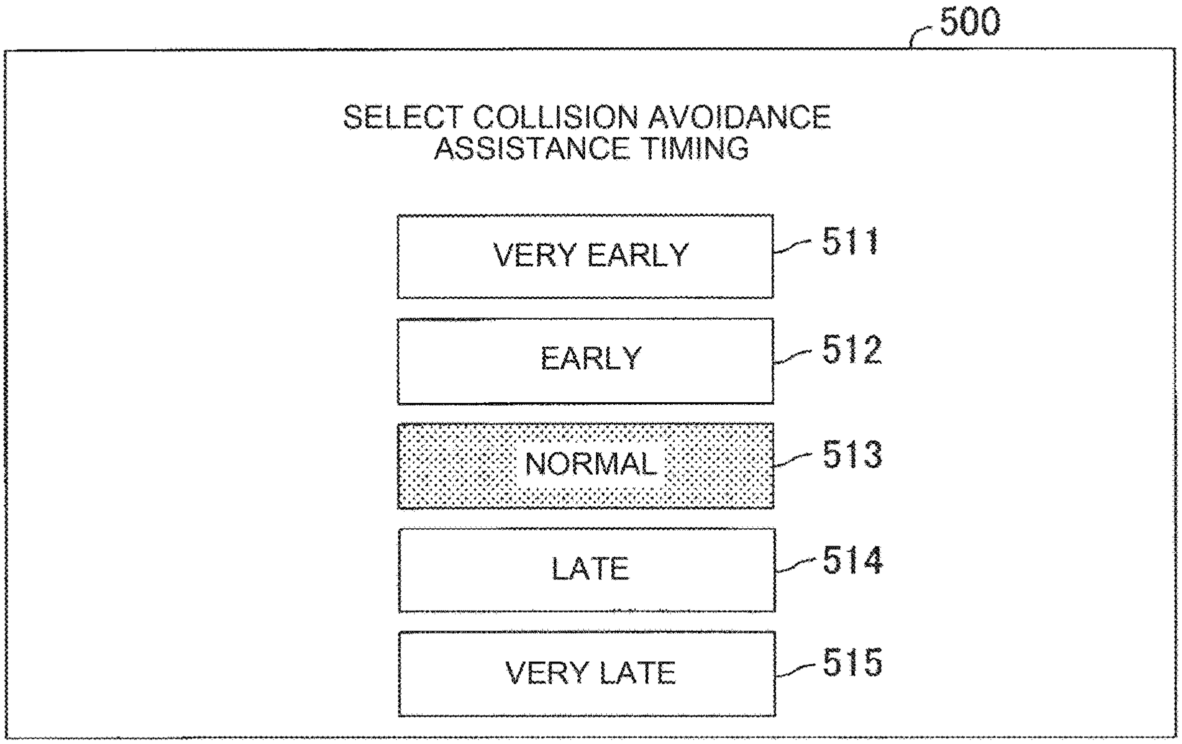
FIG. 5 is a diagram illustrating a screen displayed on a display illustrated in FIG. 1.

Now, when a predetermined operation is performed on the touchscreen display 83, the navigation ECU 80 displays a selection screen 500 illustrated in FIG. 5 for selecting a collision avoidance assistance timing, on the touchscreen display 83. This selection screen 500 includes a button 511 labeled "Very early", a button 512 labeled "Early", a button 513 labeled "Normal", a button 514 labeled "Late", and a button 515 labeled "Very late". By performing a touch operation on one of these buttons, the driver can change or set the basic threshold time TTCthB under normal circumstances (i.e., when the attention of the driver to driving is not reduced), thereby setting the collision avoidance assistance timing. Note that in a default state (initial state), the button 513 labeled "Normal" is automatically selected.

More specifically, upon the driver performing a touch operation on one of the buttons 511 to 515, the CPU makes a determination of "Yes" in S410, and advances to S420. In S420, the CPU references a lookup table LT that is stored in ROM in advance, and sets the basic threshold time TTCthB to a value corresponding to the button on which the touch operation was made.

That is to say, when the button 511 labeled "Very early" is operated by touching, the CPU sets the basic threshold time TTCthB to a time T1. When the button 512 labeled "Early" is operated by touching, the CPU sets the basic threshold time TTCthB to a time T2. When the button 513 labeled "Normal" is operated by touching, the CPU sets the basic threshold time TTCthB to a time T3. When the button 514 labeled "Late" is operated by touching, the CPU sets the basic threshold time TTCthB to a time T4. When the button 515 labeled "Very late" is operated by touching, the CPU sets the basic threshold time TTCthB to a time T5. A relation of the following Expression (1) is satisfied among time T1 to time T5.

$$T1>T2>T3>T4>T5 \quad (1)$$

Next, the CPU advances to S430, and acquires a value (T1−TTCthB) obtained by subtracting the basic threshold time TTCthB from the time T1, as a correction margin TS.

Next, the CPU advances to S440, and sets a threshold correction value dTTCth to a value (a TS) obtained by multiplying the correction margin TS by a coefficient $\alpha$. The coefficient $\alpha$ is a value greater than "0" and smaller than "1". Thereafter, the CPU advances to S495 and ends this routine for the time being. Note that the basic threshold time TTCthB, the correction margin TS, and the threshold correction value dTTCth are stored in non-volatile memory of the driver assistance ECU 10.

When the CPU advances to S410, and that point in time is not a point in time immediately following a touch operation being performed on any one of the buttons 511 to 515, the CPU advances directly from S410 to S495 and ends this routine for the time being.

As described above, the device DS starts the collision avoidance assistance operation (first operation) earlier when the attention of the driver to driving is reduced, whereby the likelihood of a collision between the host vehicle HV and an obstruction can be reduced. In particular, when the obstruction is either a two-wheeled vehicle or a pedestrian, the alarm operation serving as a collision avoidance assistance operation is started earlier, enabling the driver to recognize these obstructions early on and begin appropriate driving with respect thereto.

Note that the disclosure is not limited to the above embodiment, and various modifications can be adopted within the scope of the disclosure. For example, the processing of S245 in FIG. 2 may be omitted. In this case, upon determination of "Yes" in S215, the CPU advances to S250. Further, in S235, the CPU may execute automatic braking as a collision avoidance assistance operation, in addition to the alarm operation serving as a collision avoidance assistance operation.

Figure 6:
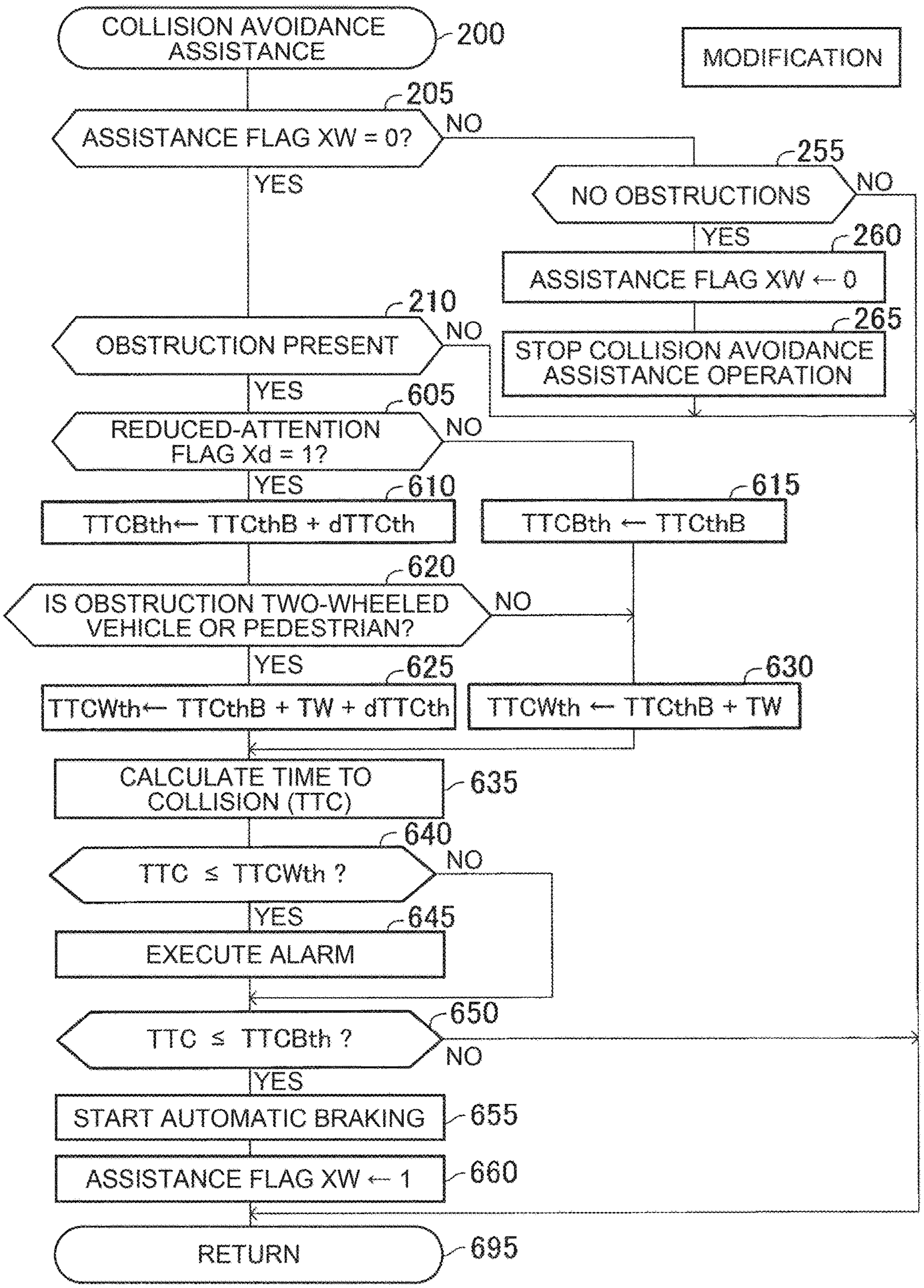
FIG. 6 shows a routine executed by the CPU, according to a modification of the embodiment of the disclosure.

Further, the CPU according to the modification of the driver assistance ECU 10 may execute a routine shown in FIG. 6 instead of the routine shown in FIG. 2. In FIG. 6, some steps that are the same as those shown in FIG. 2 are denoted by the same signs as those by which the steps shown in FIG. 2 are denoted. Description of these steps will be omitted.

That is to say, when the CPU determines in S210 of FIG. 6 that an obstruction is present, the CPU determines in S605 whether the reduced-attention flag Xd is "1". When the reduced-attention flag Xd is "1", the CPU advances from S605 to S610, and sets an automatic braking threshold time TTCBth to a "sum of the basic threshold time TTCthB and the threshold correction value dTTCth that is described above". Thereafter, the CPU advances to S620. On the other hand, when the reduced-attention flag Xd is not "1", the CPU advances from S605 to S615, and sets the automatic braking threshold time TTCBth to the basic threshold time TTCthB. Thereafter, the CPU advances to S630.

In S620, the CPU determines whether the type of obstruction is a "two-wheeled vehicle or a pedestrian". When the type of obstruction is either one of "two-wheeled vehicle and pedestrian", the CPU advances from S620 to S625 and sets an alarm threshold time TTCWth to a "sum of the basic threshold time TTCthB, a positive certain time TW, and the above-described threshold correction value dTTCth". Thereafter, the CPU advances to S635. On the other hand, when the type of obstruction is neither of "two-wheeled vehicle and pedestrian", the CPU advances from S620 to S630, and sets the alarm threshold time TTCWth to a "sum of the basic threshold time TTCthB and the certain time TW". Thereafter, the CPU advances to S635.

The CPU calculates the Time To Collision TTC in S635, and determines in S640 whether the Time To Collision TTC is no more than the alarm threshold time TTCWth. When the Time To Collision TTC is no more than the alarm threshold time TTCWth, the CPU executes the above-described alarm operation in S645. Thereafter, the CPU advances to S650. When the Time To Collision TTC is not no more than the alarm threshold time TTCWth, the CPU advances directly from S640 to S650.

In S650, the CPU determines whether the Time To Collision TTC is no more than the automatic braking threshold time TTCBth. When the Time To Collision TTC is no more than the automatic braking threshold time TTCBth, an automatic braking starting condition serving as a collision avoidance assistance starting condition is satisfied. For convenience, the automatic braking starting condition is also referred to as "second condition". As can be understood from the above, when the reduced-attention flag Xd is "1", the second condition is changed to a second early-satisfied condition which is satisfied earlier than when the reduced-attention flag Xd is "0" (see S610, S615 and S650).

When the Time To Collision TTC is no more than the automatic braking threshold time TTCBth, in S655 the CPU starts the automatic braking that is described above. Thereafter, the CPU sets the value of the assistance flag XW to "1" in S660, advances to S695, and ends this routine for the time being. When the Time To Collision TTC is not no more than the automatic braking threshold time TTCBth, the CPU advances directly from S650 to S695 and ends this routine for the time being.

Thus, when the reduced-attention flag Xd is set to "1", the CPU according to the modification changes the automatic braking starting condition to a condition that is satisfied earlier than when the reduced-attention flag Xd is not set to "1", regardless of the type of obstruction. In a case in which the reduced-attention flag Xd is "1", the CPU changes the alarm generation condition to a condition that is satisfied earlier than when the reduced-attention flag Xd is not "1", only when the obstruction is either a two-wheeled vehicle or a pedestrian.

In addition, the CPU according to the above embodiment and modification may execute just any one or two of steps out of "S320, S340, and S350" between S310 and S330 in FIG. 3. When the determination condition for the step to be executed is satisfied, the CPU may advance to S330 and set the reduced-attention flag Xd to "1". In this configuration, when S320 is not executed, S360 is omitted, when S340 is not executed, S370 is omitted, and when S350 is not executed, S380 is omitted. That is to say, the CPU may presume that the attention of the driver to driving is reduced when at least one of any combination of one or more of the above first to third cases is occurring (i.e., when a particular state is occurring). The CPU may change the condition (first condition) that needs to be satisfied in order to start a collision avoidance assistance operation (first operation) to a "condition that is satisfied earlier (first early-satisfied condition)" as compared to a case in which none of the combinations are occurring (i.e., a case in which no particular state is occurring).

Also, the CPU may set the collision determination threshold time TTCth in S255 to a "value obtained by adding the correction margin TS to the basic threshold time TTCthB". When making a determination of "No" in S245, the CPU may set the collision determination threshold time TTCth to a "value obtained by adding the threshold correction value dTTCth to the basic threshold time TTCthB", and then advance to S225. Further, the collision likelihood index value may be an inverse of the Time To Collision TTC, in which case the first condition is satisfied when the collision likelihood index value reaches a first threshold, and the second condition is satisfied when the collision likelihood index value reaches a second threshold that is greater than the first threshold. In addition, the disclosure is applicable to a host vehicle HV in a state in which a driving mode has transitioned from automated driving to driving by a driver in an automated driving vehicle.

What is claimed is:

1. A collision avoidance assistance device for a vehicle, the collision avoidance assistance device comprising a controller configured to:

calculate a collision time based on a distance and a relative speed between the vehicle and a target;

generate an alarm to a driver of the vehicle in a case where the collision time is equal to or shorter than a first time;

set a second time as the first time in a case where a particular state is occurring, the second time being longer than the first time, the particular state being a state in which a mobile device is receiving an incoming signal, the mobile device being communicably connected to in-vehicle equipment installed in the vehicle;

determine whether the target is a two-wheeled vehicle or a pedestrian;

maintain the first time even when the particular state is occurring in a case where the target is neither the two-wheeled vehicle nor the pedestrian;

execute automatic braking for avoiding collision of the vehicle and the target in a case where the collision time is equal to or shorter than a third time, the third time being shorter than the first time; and set a fourth time as the third time regardless of a type of the target in a case where the particular state is occurring, the fourth time being longer than the third time.

2. The collision avoidance assistance device according to claim 1, wherein the controller is configured to:

determine whether a period has elapsed since the driver has operated the in-vehicle equipment last in response to the incoming signal received on the mobile device; and continue to set the second time as the first time until the period has elapsed in a case where the controller determines that the period has not elapsed.

3. A collision avoidance assistance method for a vehicle, the collision avoidance assistance method comprising:

calculating a collision time based on a distance and a relative speed between the vehicle and a target;

generating an alarm to a driver of the vehicle in a case where the collision time is equal to or shorter than a first time;

setting a second time as the first time in a case where a particular state is occurring, the second time being longer than the first time, the particular state being a state in which a mobile device is receiving an incoming signal, the mobile device being communicably connected to in-vehicle equipment installed in the vehicle;

determining whether the target is a two-wheeled vehicle or a pedestrian;

maintaining the first time even when the particular state is occurring in a case where the target is neither the two-wheeled vehicle nor the pedestrian;

executing automatic braking for avoiding collision of the vehicle and the target in a case where the collision time is equal to or shorter than a third time, the third time being shorter than the first time; and setting a fourth time as the third time regardless of a type of the target in a case where the particular state is occurring, the fourth time being longer than the third time.

4. A non-transitory storage medium storing instructions that are executable by a computer installed in a vehicle and that cause the computer to execute functions comprising:

calculating a collision time based on a distance and a relative speed between the vehicle and a target;

generating an alarm to a driver of the vehicle in a case where the collision time is equal to or shorter than a first time;

setting a second time as the first time in a case where a particular state is occurring, the second time being longer than the first time, the particular state being a state in which a mobile device is receiving an incoming signal, the mobile device being communicably connected to in-vehicle equipment installed in the vehicle;

determining whether the target is a two-wheeled vehicle or a pedestrian;

maintaining the first time even when the particular state is occurring in a case where the target is neither the two-wheeled vehicle nor the pedestrian;

executing automatic braking for avoiding collision of the vehicle and the target in a case where the collision time is equal to or shorter than a third time, the third time being shorter than the first time; and setting a fourth time as the third time regardless of a type of the target in a case where the particular state is occurring, the fourth time being longer than the third time.

* * * * *